Aug. 14, 1945. R. M. MAHONEY Re. 22,665

MATERNITY GARMENT

Original Filed July 16, 1941

INVENTOR.
Ruth M. Mahoney
BY Carlos G. Stratton
ATTORNEY

Reissued Aug. 14, 1945

Re. 22,665

UNITED STATES PATENT OFFICE 22,665

MATERNITY GARMENT

Ruth M. Mahoney, Santa Monica, Calif.

Original No. 2,272,017, dated February 3, 1942, Serial No. 402,657, July 16, 1941. Application for reissue February 19, 1943, Serial No. 476,475

10 Claims. (Cl. 2—76)

My invention relates to a maternity garment and more particularly to a garment of the type which may be expanded at the waist to accommodate increases in girth of the wearer during pregnancy. The invention may be applied to single-piece dresses, two-piece dresses, suits, play clothes, slacks, bathing suits, bolero dresses, house dresses, etc.

The principal object of the invention is to provide means in a maternity garment that will maintain the hemline and/or the waistline of the garment in their respective horizontal planes during the period of pregnancy.

One of the objects of the invention is the provision of a front panel effect that will permit successive expansion of the garment at the waistline without enlarging the panel effect and yet provide simple adjustment means.

Another object is the provision of means for successively lowering a front panel member at the front of the waist of the garment, to aid in maintaining the waistline and/or the hemline in their respective horizontal planes, and also to provide for an increase in the size of the bust.

A further object of my invention is to provide a maternity garment of the pleated type characterized by simple and easily adjusted means for maintaining the hemline and/or waistline in their respective horizontal planes during the pregnancy.

Still another object of the invention is to provide a maternity garment whose styling may be improved and at the same time render better adaptability for the intended purpose.

My invention also has for its objects to provide such a maternity garment that may be adjusted without sewing, convenient and comfortable in use, economical of manufacture, relatively simple and of general superiority and serviceability.

The invention also comprises novel details of construction and novel combinations and arrangements of parts, which will more fully appear in the course of the following description. However, the drawings merely show and the following description merely describes two embodiments of the present invention, which are given by way of illustration or example only.

In the drawing, like reference characters designate similar parts in the several views.

The invention includes two separate and distinct adjustments, each of which, singly and in combination, involves a definite principle and comprises, first, an adjustment at the waistline of the skirt, by adjusting deep pleats at the center front section of the skirt, which center front section may form a panel effect, for the purpose of regulating the girth adjustment; and, second, an adjustment vertically between the center front section of the skirt and the center front section of the blouse to maintain normal and even the hemline across the center front of the garment, such adjusting means being between the waistline and the top of the shoulders.

Figure 1:
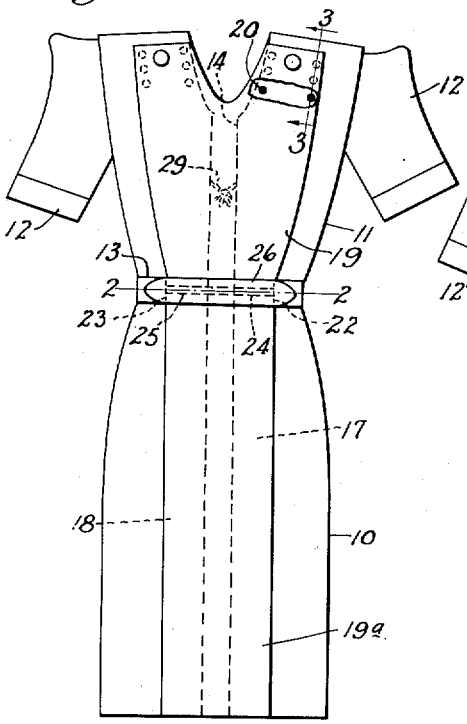
Fig. 1 is a front elevation of an embodiment of the present invention.
Figure 2:
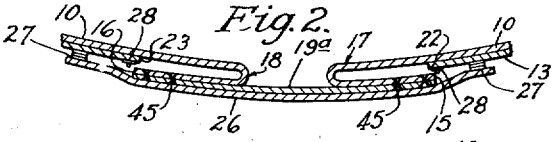
Fig. 2 is an enlarged, broken, horizontal section taken along line 2—2 of Fig. 1, at the front of the garment.
Figure 3:
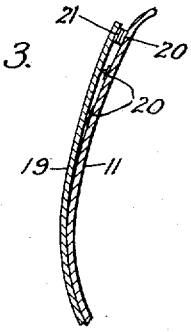
Fig. 3 is an enlarged, vertical section taken along line 3—3 of Fig. 1.

Referring more in detail to Figs. 1 to 3, the garment shown consists of a skirt portion 10 and a blouse portion 11, which may be provided with sleeves 12. A separate belt or waistband, indicated at 13, extends around the dress at the waist thereof, as shown in Fig. 1. In this construction it will be noted that the panel 19, which may be the center front portion of the blouse is fashioned to aline with the center front section or panel effect member 19*a* of the skirt, and that the center front portion of the skirt is arranged to be connected to the center front portion of the blouse at different points thereon vertically, but it is to be understood that the belt or waistband may be eliminated, or other styles of belts or waistbands may be used.

The blouse portion 11 may be provided with a centrally front located front slit 14 that may extend from the neck line of the dress to the waistband. The skirt portion 10 is preferably not made with a continuation of the slit 14. The two vertical broken lines in the skirt portion 10 of Fig. 1 represent adjacent folds of pleats 17 and 18 formed near the edge portions 15 and 16 of skirt portion 10. The space between the pleats 17 and 18 may be vertically aligned with the slit 14 of the blouse portion so as to substantially form a continuation thereof.

Overlying the slit 14 the drawing shows a front panel 19 which extends from the shoulders to the waistline, and a panel or panel effect 19*a* is shown overlying the space between the folds of the pleats 17 and 18. The panel effect member 19a is the center front portion of the skirt, the pleats 17 and 18 being formed laterally of said front or center portion or panel effect to provide for girth adjustment. It will be noticed at 45 that the edges 15 and 16 are attached to the edge portions of the panel effect member 19a at the waistline by any desirable means, the purpose being to hold the pleats 17 and 18 in their normal position, which is flat, or substantially so, against the underside of the portion 19a, and to permit the ready removal of such fastening means to enable the pleats to unfold in conformity with the expansion at the girth. Whether these fastening means be snaps, threads or any other device, they are temporary fastenings which aid in maintaining a neat and finished appearance.

Figure 5:
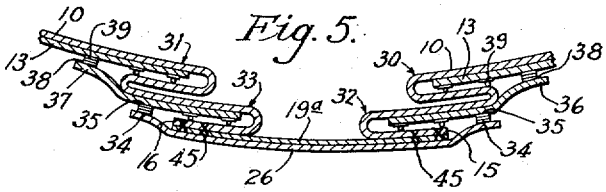
Fig. 5 is an enlarged, broken, horizontal section taken along line 5—5 of Fig. 4, at the front of the garment.

In the forms shown in the drawings, the portion of the panel 19 in front of the blouse portion 11 is only secured thereto upon the shoulders of the blouse by suitable fastening means 20. While snap fasteners are shown in the drawings for such fastening means, it is to be understood that other suitable fastening means may be used. The fastening means (whether snap fasteners or other fastening means) are preferably located in substantially horizontal series at different elevations. The fastening means 20 shown in the drawings are provided in banks of four, i. e., each bank comprises two fastening means correspondingly arranged on each shoulder in substantially horizontal series. It is contemplated that only one of these banks or substantially horizontal series shall be used at any given time. When the waistline is fully retracted, as shown in Figs. 2 and 5, the uppermost series or bank will be utilized, such as shown in Fig. 3. If a waistband such as shown at 13 in the drawing is used instead of a full belt, such waistband may end at the points 22 and 23 shown in Fig. 2. The blouse 11 is separated from the skirt 10 at the front between the points 22 and 23, which define two horizontal rows of stitching 24 and 25. Overlying the stitching 24 and 25 is a belt or waistband portion 26, which is shown as being attached to the panel 19 and panel effect member 19a on the skirt, it being understood that panel 19 and panel effect member 19a are secured together or to the waistband portion 26. When the panel 19 or center front portion of the blouse and the panel effect member 19a or center front section of the skirt are secured together, as may be, the panel 19, or center front portion of the blouse is secured to the skirt, the panel effect portion 19a being a part of the skirt. However, it is to be understood that this arrangement is one of styling and is not an essential arrangement of the present invention.

The ends of the belt portion or waistband portion 26 project beyond the panel or panel effect member 19a, and the ends of such portion 26 are provided with fasteners 27 intended for cooperation with selected ones of fasteners 28 carried by the skirt in order to adjust the depth of the pleats 17 and 18 and hence the cross sectional arrangement of the garment at the waistline.

One or more tie strings 29 may be employed for maintaining in position the edge portions providing the slit 14. Moreover, it is to be understood that a greater number of fastening means 20, 21, 27 and 28 may be employed to render a wider range of adjustment and finer adjustments.

Figure 4:
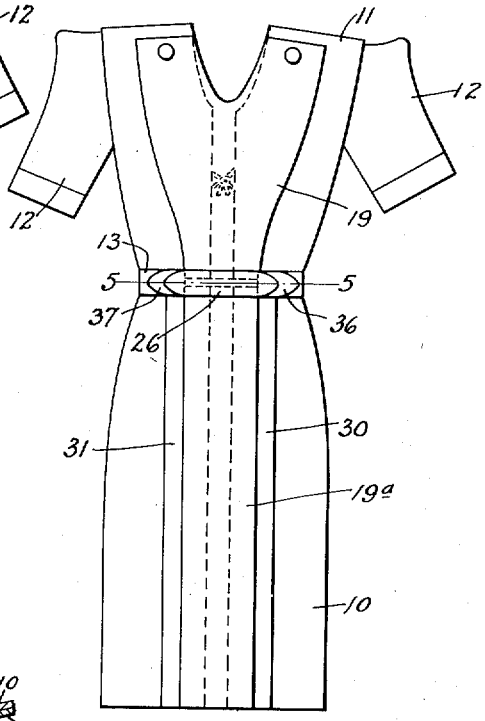
Fig. 4 is a front elevation similar to Fig. 1, but showing a modified form of the present invention.

The garment shown in Figs. 4 and 5 is similar to the one just described. The manner of supporting the panel 19 of the blouse portion 11 is identical to that hereinbefore described. At the waist and in the skirt portion, however, the garment is provided with four pleats 30, 31, 32 and 33, instead of just two pleats. The four pleats are formed in pairs at opposite sides of the panel or panel effect member 19a of the skirt portion 10 by twice doubling the skirt material beneath the edges of the panel effect member 19a.

Belt portions or waistband portions 36 and 37 overlie the front, adjacent ends of the waistband or belt 13. Fastening means 34 and 35 respectively attached to the belt portions or waistband portions 26 and 36 and 37 cooperate with each other to maintain the pleats 32 and 33 in their folded positions shown in Fig. 5.

The outer ends of the belt portions or waistband portions 36 and 37 carry fastening means 38 which cooperate with fastening means 39 on the adjacent front ends of the belt or waistband 13. The pleats 30 and 31 are thereby maintained in the folded positions. It is to be understood that there is a series of cooperating fastening means 35 and 39 to provide for successive adjustment as the waist is successively enlarged. It is to be understood that snap fasteners or any other suitable means may be used for the fastening means.

In the use of any aforedescribed garment, as the girth of the wearer increases, the width of the pleats 17 and 18 is successively reduced, and the fastening means 27 successively engages subsequent successive fastening means 28. In the forms shown in Figs. 4 and 5, first one pair of pleats may be let out and then the other. For instance, the pleats 30 and 31 may first be successively let out, and then the pleats 32 and 33.

In each form the panel 19 of the blouse portion 11 is lowered by engaging the fastening means 21 with successively lower fastening means 20, as the waistband or belt is let out. This adjustment progressively compensates for the tendency of the hemline and waistline to progressively rise in the front, as the pregnancy advances. Thus the hemline and waistline are maintained in their respective horizontal planes.

In the hereunto appended claims, "waistband" shall be taken to mean a waistband or belt.

While I have illustrated and described what I now regard as the preferred embodiment of my invention, the construction is, of course, subject to modification without departing from the spirit and scope of my invention. I, therefore, do not wish to restrict myself to the particular form of construction illustrated and described, but desire to avail myself of all modifications that may fall within the scope of the appended claims.

Having thus described my invention, what I claim and desire to secure by Letters Patent is:

1. A maternity dress comprising a skirt having two generally parallel edges at the front thereof defining a centrally located space therebetween, a blouse portion, said blouse portion being slit in front from the waistline to the neckline, the split in the blouse portion being in vertical alignment with the space between the edges of the skirt, and a front panel overlying the slit in the blouse portion and extending from the shoulders thereof to the hemline of the dress, the edges of said skirt being folded back upon themselves and attached to said panel to define two pleats, means connecting the blouse portion to the skirt portion, the connection being interrupted adjacent the slit, a plurality of fasteners connecting the upper edge of said panel to the shoulder portion of said blouse, and a plurality of fasteners for supporting said skirt pleat at different depths to allow for adjustment to accommodate increase in girth of the wearer, said first-named fasteners lying in different horizontal planes to allow said panel to be lowered as the waistline of the wearer increases, to insure maintenance of an even front hemline.

2. A maternity dress comprising a skirt having two generally parallel edges at the front thereof defining a centrally located space therebetween, a blouse portion, said blouse portion being slit in front from the waistline to the neckline, the slit in the blouse portion being in vertical alignment with the space between the edges of the skirt, and a front panel overlying the slit in the blouse portion and extending from the shoulders thereof to the hemline of the dress, the edges of said skirt being folded back upon themselves a plurality of times and attached to said panel to define a plurality of pleats on either side thereof, means connecting the blouse portion to the skirt portion, the connection being interrupted adjacent the slit, a plurality of fasteners connecting the upper edge of said panel to the shoulder portion of said blouse, and a plurality of fasteners for supporting said skirt pleat at different depths to allow for adjustment to accommodate increase in girth of the wearer, said first-named fasteners lying in different horizontal planes to allow said panel to be lowered as the waistline of the wearer increases, to insure maintenance of an even hemline.

3. A maternity dress comprising a skirt having two generally parallel edges at the front thereof defining a centrally located space therebetween, a blouse portion, said blouse portion being slit in front from the waistline to the neckline, the split in the blouse portion being in vertical alignment with the space between the edges of the skirt, and a front panel overlying the slit in the blouse portion and extending from the shoulders thereof to the hemline of the dress, the edges of said skirt being folded back upon themselves and attached to said panel to define two pleats, means connecting the blouse portion to the skirt portion, the connection being interrupted adjacent the slit, a plurality of fasteners connecting the upper edge of said panel to the shoulder portion of said blouse, a belt attached to and extending laterally of said panel, said belt being provided with a plurality of fasteners, cooperating fasteners on means connecting the skirt portion and the blouse portion, said fasteners supporting said skirt pleat at different depths to allow for adjustment to accommodate increase in girth of the wearer, said first-named fasteners lying in different horizontal planes to allow said panel to be lowered as the waistline of the wearer increases, to insure maintenance of an even hemline.

4. A maternity garment comprising a dress having skirt and blouse portions, the blouse portion being continuously split vertically at the front and the skirt and blouse portions connected to each other along the waistline at the sides and back, but separated at the front, the skirt having frontal pleats spaced apart and the space between said pleats coinciding with the split in the blouse portion a panel depending substantially from the shoulder portions of the blouse, and overlying, the split front of the blouse and the space between said frontal pleats, said panel being secured to the skirt at the waistline, and fastening means disposed to support the panel from the upper portion of the blouse, the fastening means including a series of fastening elements at different elevations, to successively lower the panel.

5. A maternity garment comprising a skirt having in the front spaced folds of pleats and a blouse portion connected to the skirt the center front portions of the skirt and blouse being unconnected, an expansible waistband, a panel depending continuously along the front of the skirt and blouse and sewn to side members of the skirt at the waistline along opposite sides of the spaced pleats thereof, the panel being movable downwardly relatively to the blouse portion and fastening means disposed to support the panel from the upper portion of the blouse, the fastening means including a series of fastening elements at different elevations, to successively lower the panel and thereby lower the waistband and skirt at the front thereof.

6. A maternity dress comprising a skirt having two laterally spaced vertical edges at the front thereof, folded back upon themselves and forming laterally opening pleats, a blouse slit vertically at the front thereof from its waistline to its neckline, the blouse and skirt being connected at the waist only along the side and back portions thereof, and a front panel extending from the neckline of the blouse to the hemline of the skirt and attached to the waistline of the skirt, the upper portion of said panel loosely overlying the slit of the blouse and having at its upper end vertically adjustable connections with the upper portion of said blouse at opposite sides of the slit thereof, and the lower portion of said panel being attached along its side portions continuously along the folded portions of said skirt pleats to cover the space between the vertical edges of the skirt, and laterally adjustable connections between said panel intermediate its upper and lower ends at the waistline.

7. A maternity garment having a skirt portion provided with a pair of pleats at the sides of the front forming a panel effect at the front extending from the waist to the hemline, said panel effect being arranged to cover the pleats and the space therebetween, a waistband for the skirt having end portions and series of fastening means adjacent thereto, a waistband section secured to and across the panel effect and having end portions extending beyond the edge portions thereof, the said end portions of said panel effect waistband portion having cooperating fasteners for adjustable engagement with said first mentioned fasteners.

8. A maternity garment comprising skirt and blouse portions connected together at the waist line, but unconnected at the center front portions thereof, said skirt portion having means at the sides of the center front portion thereof to regulate the girth adjustment, the center front portion of the skirt being vertically adjustable relative to the center front portion of the blouse to maintain an even hemline across the center front of the skirt, and means between the waistline and the shoulder line of the blouse and cooperating with means on the center front portion of the skirt to secure the top of the front section of the skirt in adjusted position.

9. A maternity garment including a blouse portion and a skirt portion connected together except at the center front of both portions of the garment, said skirt portion having spaced pleats at the sides of the center front and adjustable at the waistline in conformity with variations in girth, and means to maintain normal the hemline of the skirt during any variation of the girth, including mutually co-operating and engaging means on and between the center front portion of the skirt and the shoulder line of the garment whereby the center front of the skirt may be adjusted vertically relative to the blouse.

10. A maternity garment including a blouse portion and a skirt portion, said portions being connected together at the waistline, but unconnected at the center front sections of both portions of the garment, said center front section of the skirt portion being vertically adjustable relative to the center front section of the blouse portion to maintain an even horizontal hemline across the center front section of the skirt, and means between the waistline of the garment and the shoulderline to secure said center front section in its adjusted position.

RUTH M. MAHONEY.